United States Patent [19]
Romano

[11] Patent Number: 5,705,992
[45] Date of Patent: Jan. 6, 1998

[54] PLUG-IN PICTURE WITH RECORDED MESSAGE

[76] Inventor: Camille Romano, 7436 SW. 117th Ave. Suite 208, Miami, Fla. 33183

[21] Appl. No.: 802,394

[22] Filed: Feb. 18, 1997

[51] Int. Cl.⁶ .................................................. G08B 25/08
[52] U.S. Cl. ........................... 340/692; 340/691; 340/693; 40/455; 40/546
[58] Field of Search .......................... 340/692, 691, 340/693, 457, 457.1, 457.2, 457.3, 457.4, 460, 326, 328, 815.46, 815.47, 321, 384.7, 384.1, 474, 473, 472; 40/714, 717, 455, 546

[56] References Cited

U.S. PATENT DOCUMENTS

| | | | |
|---|---|---|---|
| 3,004,359 | 10/1961 | Pisciotta | 40/714 |
| 4,219,800 | 8/1980 | LeViness | 340/576 |
| 4,755,789 | 7/1988 | Paschal | 340/693 |
| 4,987,403 | 1/1991 | Apfel | 340/692 |
| 5,223,868 | 6/1993 | Coiner, II | 353/13 |
| 5,463,369 | 10/1995 | Lamping | 340/692 |
| 5,504,836 | 4/1996 | Loudermilk | 395/2.81 |

FOREIGN PATENT DOCUMENTS 6-133838  5/1994  Japan ......................... 40/717

Primary Examiner—Jeffery Hofsass
Assistant Examiner—Sihong Huang
Attorney, Agent, or Firm—Ezra Sutton

[57] ABSTRACT

A self-contained, electronic message-emitting device for providing a recorded message and having an illuminated framed picture or photograph or transparency contained therein, that includes a housing unit having a frame member, a sound compartment, an electronic compartment, and a plug-in power component. The frame member includes a top wall having an elongated slot opening for receiving a picture or photograph or transparency therein; a shield for protecting the picture or photograph or transparency; and members for diffusing light to illuminate the picture or photograph or transparency. The sound compartment includes a plurality of speaker members, a recording microphone, and a plurality of speaker openings for emitting the sound of a recorded message from the speaker members. The electronic compartment houses a modular integrated circuit board and a circuit that includes an electronic microchip for recording a message, a record switch to activate the circuit to record a message, a reset switch to rewind the recorded message, and a light source for illuminating the frame member. The plug-in power component supplies electrical current from a car's cigarette lighter apparatus to power the circuit.

10 Claims, 6 Drawing Sheets

PLUG-IN PICTURE WITH RECORDED MESSAGE

FIELD OF THE INVENTION

This invention relates to an electronic device for plugging into the cigarette lighter of a car having a microchip with a pre-recorded message and a lighted frame for receiving a picture in the frame. More particularly, this electronic device records and plays back a pre-recorded or personalized message that can be reviewed by the user while driving the car.

BACKGROUND OF THE INVENTION

Self-contained message emitting devices for moving vehicles have taken the form of various structures or signs (i.e. a bear state trooper, a basketball player, a football player and the like) giving a pre-recorded message (i.e. on car safety-"Buckle Up-Be Safe") in which the device is attached to the seat belt assembly, or attached onto the hub portion of the steering wheel, or attached onto the dash board of the vehicle and the like. These devices are battery operated or connected to the vehicles electrical system and are usually singular in function where the structure or sign is on a given subject (i.e. a football player saying "Don't Drink and Drive.")

These type of devices have limited use and lack versatility in operational use because they are singular in function. These devices either run on a battery pack or are connected directly into the vehicle's electrical system which is overly complex for a simple device that emits a singular message.

There remains a need for a self-contained electronic message emitting device having an illuminated frame for removably receiving and changing a still picture within the device which has either a permanent memorized message (i.e. an info commercial, a religious blessing and the like having a picture of the product or St. Peter in the frame) or a personalized message (i.e. best wishes for a safe trip having the picture of the family in the frame) being recorded within the electronic microchip of the device. In addition, the self-contained electronic message emitting device should be powered by plugging the device into the cigarette lighter of a car.

DESCRIPTION OF THE PRIOR ART

Electronic message emitting devices and the like having various designs, structure, configurations and materials of construction have been disclosed in the prior art. For example, U.S. Pat. No. 5,463,369 to Lamping discloses an electronic device having a power source, a chip having a message, and a picture mounted on the front of the device. U.S. Pat. No. 4,219,800 to LeViness discloses an electronic device having a power source, a sign with a message, and an audible reminder signal.

These prior art patents do not disclose or teach the use of an electronic message emitting device which is plugged into a cigarette lighter for power, that contains a microchip having a pre-recorded or recordable message and also contains an illuminated picture frame with changeable pictures.

Accordingly, it is an object of the present invention to provide a self-contained electronic message emitting device having a microchip with a pre-recorded message or a recordable message which is powered by plugging the device into the cigarette lighter of a car.

Another object of the present invention is to provide a self-contained electronic message emitting device having an illuminated picture frame for removably inserting and changing a still picture within the frame located on the front of the device.

Another object of the present invention is to provide a self-contained electronic message emitting device that is light-weight, easy to use, portable, convenient, and durable.

A further object of the present invention is to provide a self-contained electronic message emitting device that can be mass produced in an automated and economical manner and is readily affordable by the consumer.

SUMMARY OF THE INVENTION

In accordance with the present invention, there is provided a self-contained, electronic message-emitting device for providing a recorded message and having an illuminated framed picture or photograph or transparency contained therein, that includes a housing unit for housing a frame member, a sound compartment, an electronic compartment, and a plug-in power component.

The frame member includes a top wall having an elongated slot opening for receiving a picture or photograph or transparency therein; a shield for protecting the picture or photograph or transparency; and members for diffusing light to illuminate the picture or photograph or transparency.

The sound compartment includes a plurality of speaker members, a recording microphone, and a plurality of speaker openings for emitting the sound of a recorded message from the speaker members.

The electronic compartment houses a modular integrated circuit board and a circuit that includes an electronic microchip for recording a message, a record switch to activate the circuit to record a message, a reset switch to rewind the recorded message, and a light source for illuminating the frame member.

The plug-in power component supplies electrical current from a car's cigarette lighter apparatus to power the circuit.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein.

DETAILED DESCRIPTION OF THE PREFERRED EMBODIMENT

Figure 1:
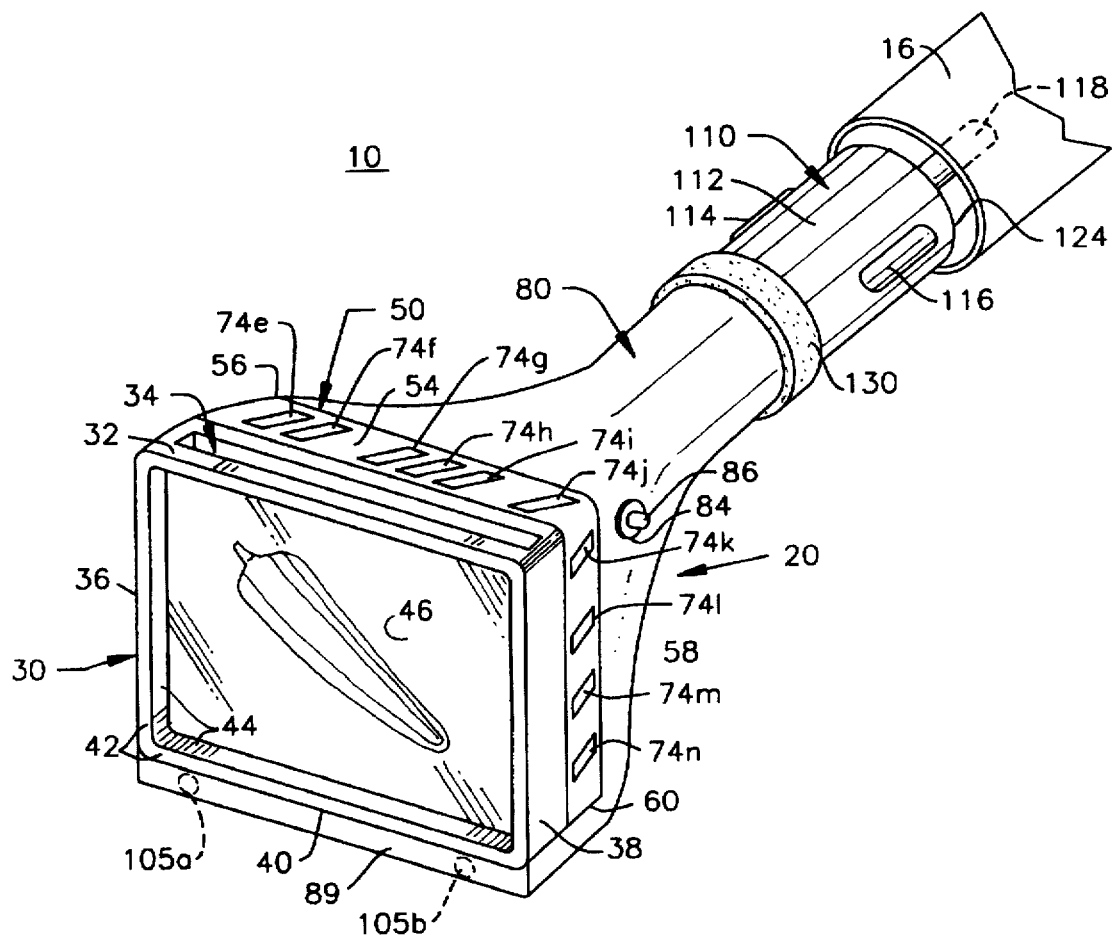
FIG. 1 is a front perspective view of the electronic message emitting device of the preferred embodiment of the present invention showing the major component parts contained therein and in operational use.

A self-contained electronic message emitting device 10 and its component parts of the preferred embodiment of the present invention are represented in detail by FIGS. 1 through 6 of the drawings. The electronic message emitting device 10 includes a housing unit 20 made of plastic having a "TV-like tube" configuration which houses a frame member 30, a sound compartment 50, an electronic compartment 80 and a plug-in power component 110.

Frame member 30 is used for holding in place a still picture 12. Frame member 30 includes a top surface wall 32 with an elongated rectangular slot opening 34 for removably receiving and/or changing an insert 12, such as a still picture or a photograph or a transparency. Frame member 30 further includes side walls 36 and 38, a bottom wall 40, an outer perimeter edging 42, and an inner side perimeter edging 44, wherein perimeter edging 42 and 44 are capable of being illuminated by a light source 104. The transparency 12 becomes visible when illuminated by light source 104 and invisible when device 10 is not activated. Frame member 30 may be made of a durable acrylic plastic for ease of light illumination. In addition, frame member 30 includes a plastic or acrylic picture shield 46 for protecting the insert or still picture 12 within frame member 30. Shield 46 is received within slot opening 34 for protecting the still picture 12.

Figure 2:
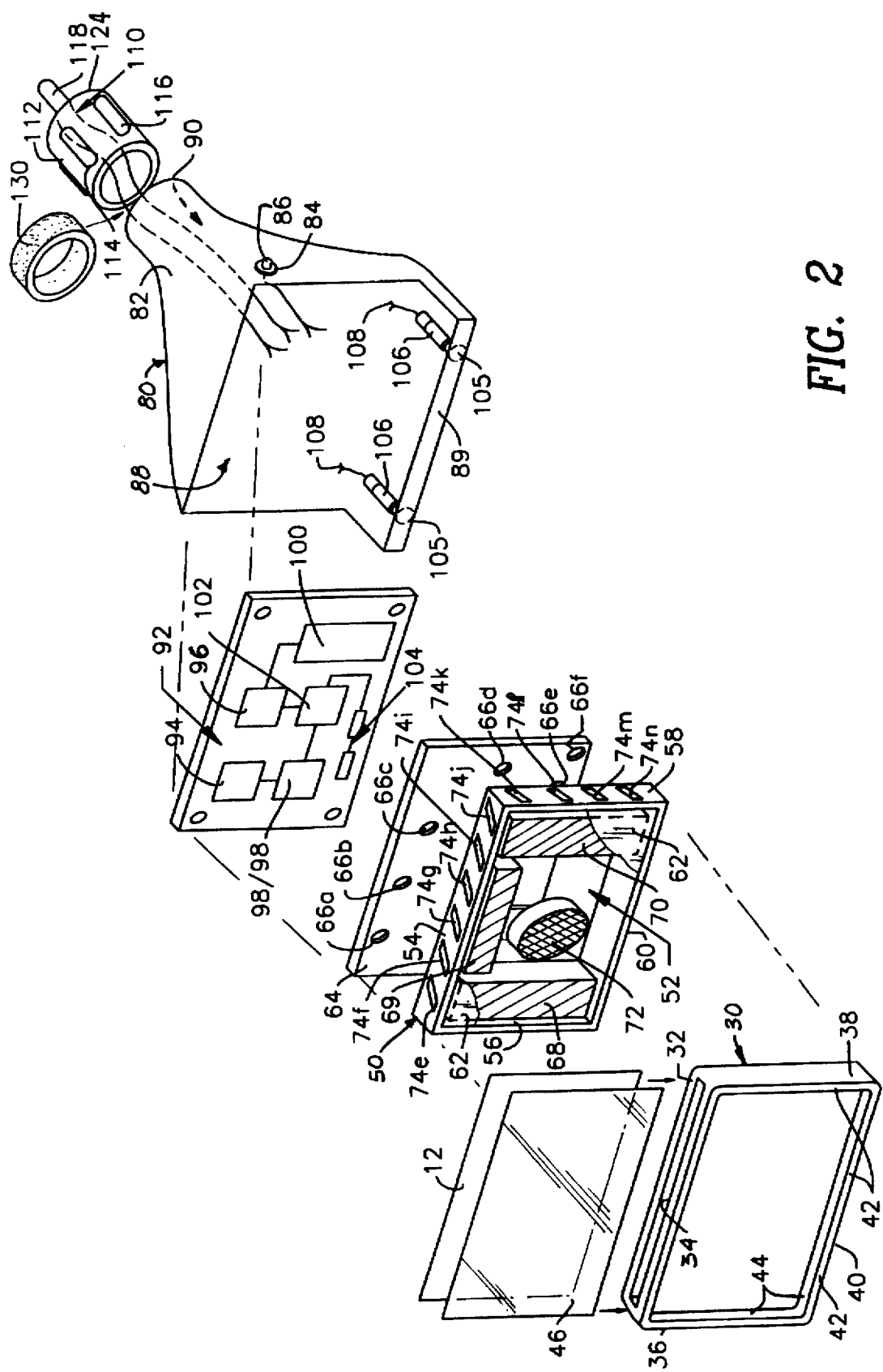
FIG. 2 is a exploded perspective view of the electronic message emitting device of the present invention showing the major component parts contained therein.

Sound compartment member 50 is used for receiving and holding within its interior compartment 52 a plurality of speaker members 68, 69, and 70 and a recording microphone 72. Sound compartment 50 includes a top surface wall 54, side surface walls 56 and 58, a bottom surface wall 60, a front wall 62 and a detachable rear wall 64 having a plurality of circular hole openings 66a to 66f for receiving electrical wiring 108. Surface walls 54 to 64 are integrally joined together to form an interior compartment 52, as shown in FIG. 2 of the drawings. In addition, top surface wall 54 and side surface walls 56 and 58 include a plurality of speaker slot openings 74a to 74n for emitting the sound 14 of a recorded message. Slot openings 74a to 74n are spaced equally-distant along each of the surface walls 54, 56 and 58, as shown in FIGS. 1, 2, and 7 of the drawings.

Figure 3:
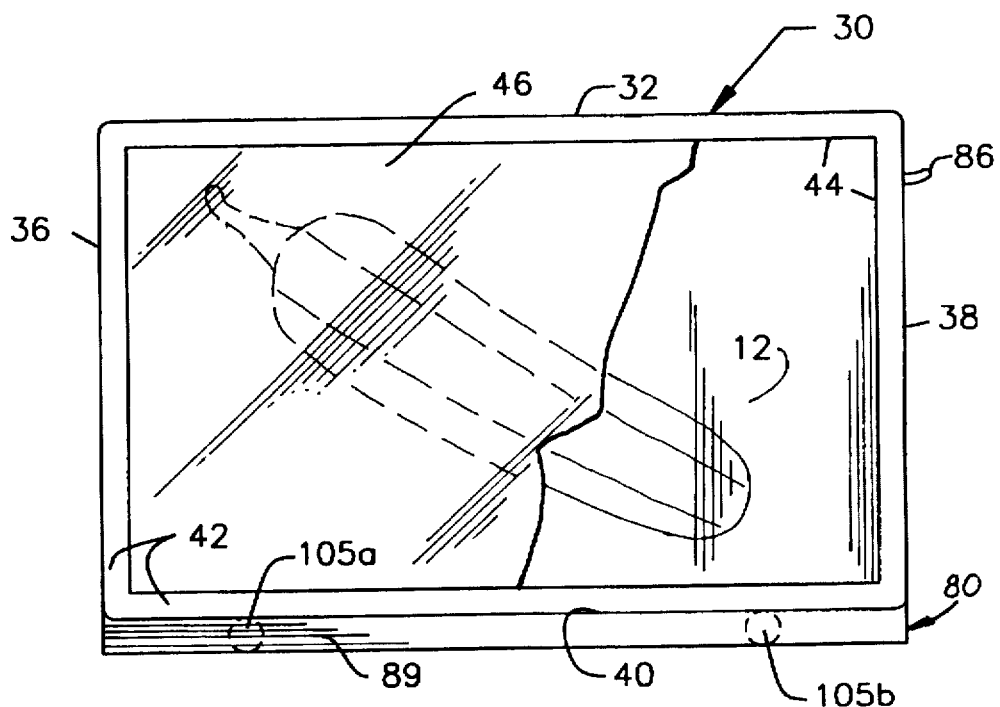
FIG. 3 is a front plan view of the electronic message emitting device of the present invention showing the illuminated frame and picture shield and picture being in operational use.
Figure 5:
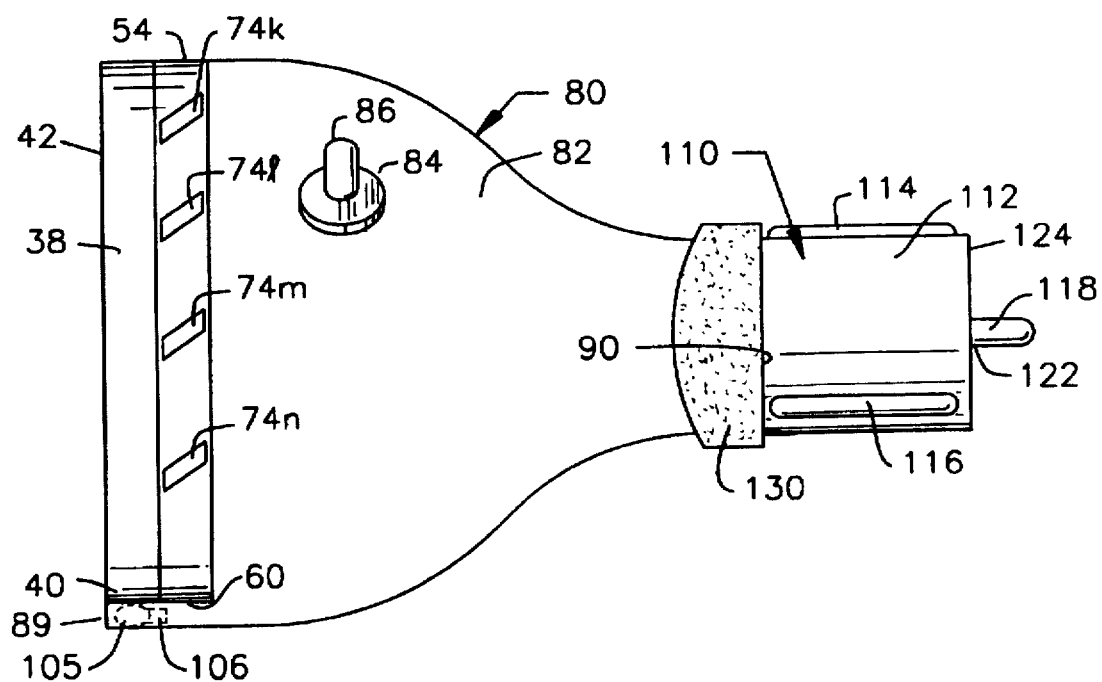
FIG. 5 is a side elevational view of the electronic message emitting device of the present invention showing the illuminated frame member, the record button, the plug-in component, the speaker and sound components and the light source.
Figure 4:
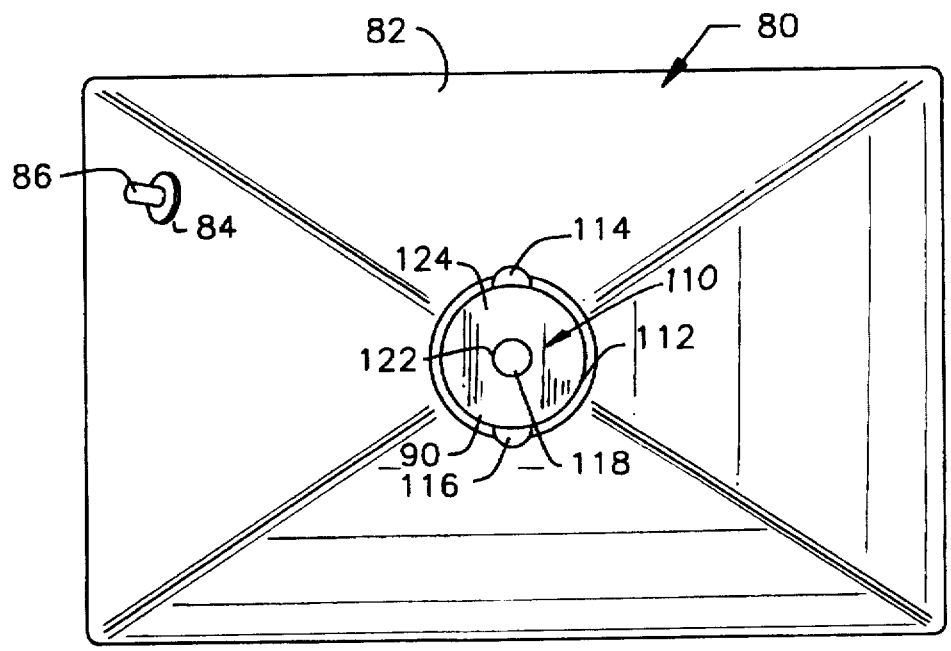
FIG. 4 is a rear plan view of the electronic message emitting device of the present invention showing the plug-in component, the record button, the speaker component and the microphone component.
Figure 8:
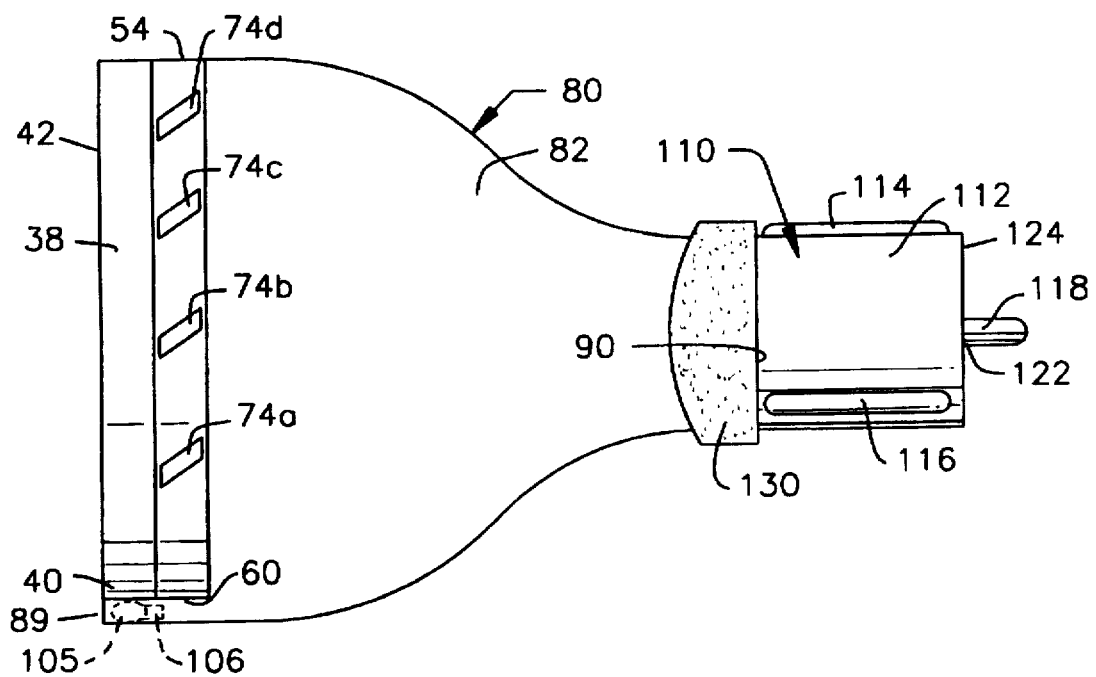
FIG. 8 is a side elevational view of the electronic message emitting device of the alternate embodiment of the present invention showing the illuminated frame member, the speaker compartment, and the plug-in component.
Figure 6:
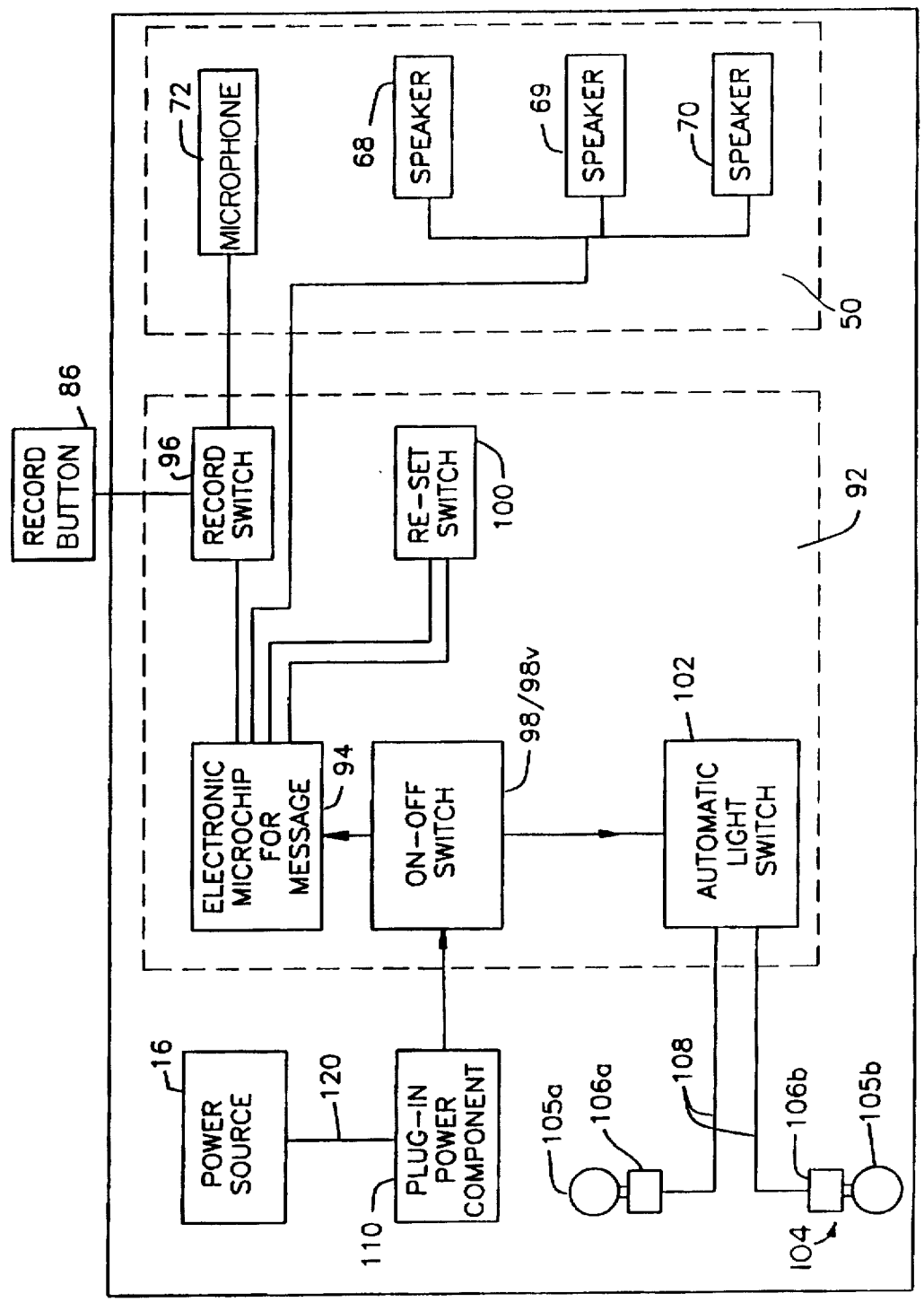
FIG. 6 is an electrical schematic diagram of the electronic message emitting device of the present invention showing the electrical circuit.

Electronic compartment 80 has an outer conical shell housing 82 with a circular hole opening 84 for receiving a record button 86. Housing 82 further includes a large opening 88 for receiving 10 and holding a substantially square-shaped modular electronic circuit board 92, and a smaller circular opening 90 for receiving and holding a swivel section 130 and the plug-in power component 110, as shown in FIG. 2 of the drawings. The modular electronic circuit board 92 includes electronic circuit connections for an electronic microchip 94 for recording a message; a record switch 96 for activating the microchip 94 to record a given message; an automatic On/Off switch 98 to initiate and stop the recorded message on microchip 94 (or a voice-activated On/Off switch 98V may be substituted for On/Off switch 98 to initiate and stop the recorded message on microchip 94); an automatic re-set switch 100 for automatically resetting the recorded message at the beginning on microchip 94; and an automatic light switch 102 for turning-on and lighting-up the light source 104 via electrical wiring 108. Light source 104 includes a plurality of light bulbs 105a and 105b and sockets 106a and 106b for illuminating frame member 30 within housing unit 20, as shown in FIGS. 1, 2, and 3 of the drawings.

Figure 7:
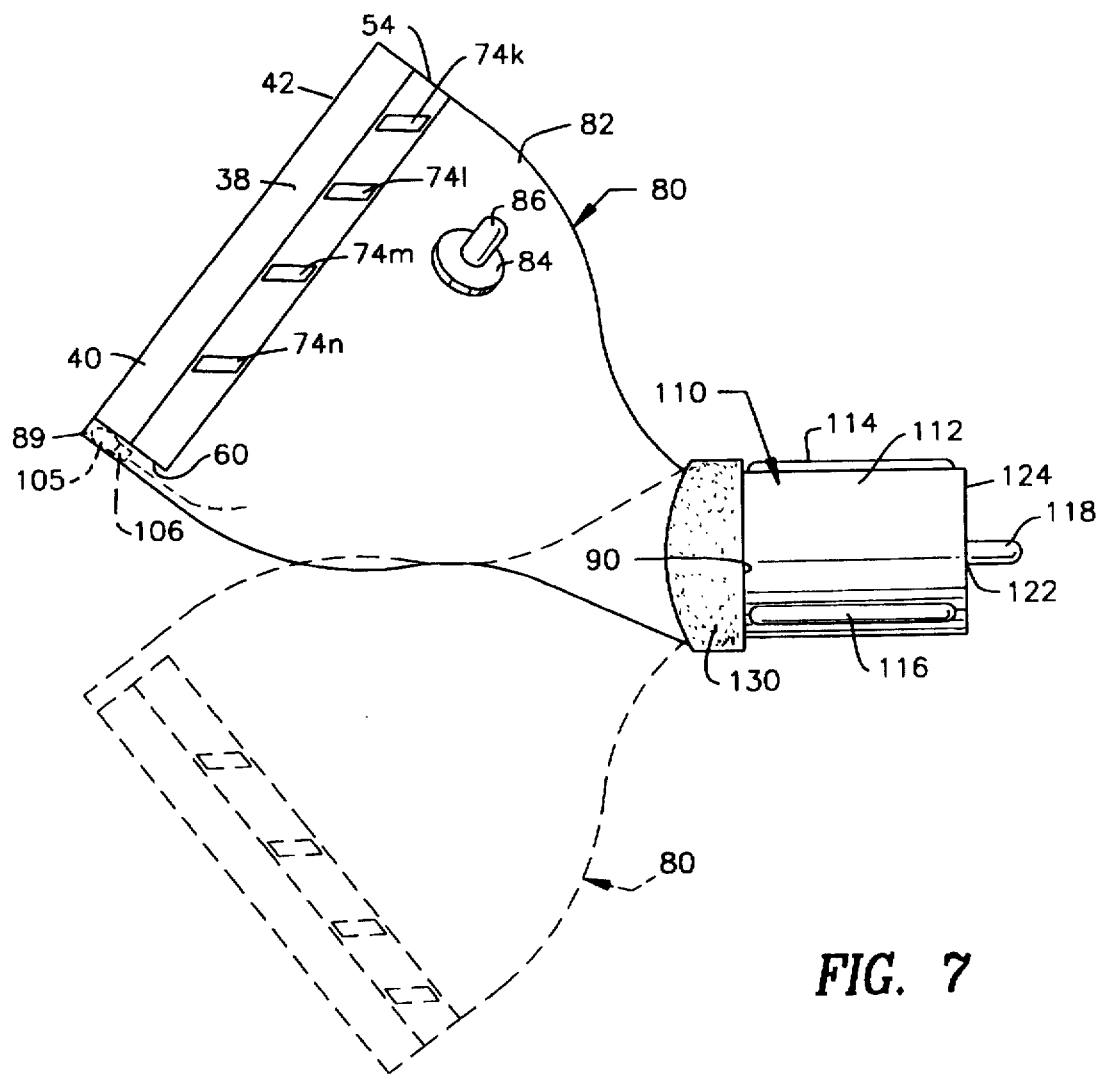
FIG. 7 is a side elevational view of the electronic message device of the present invention showing the device being moved from a down position to an up position via the swivel section.

In addition, as shown in FIG. 7, housing 82 is able to move in an up and down motion, as well as a lateral motion, by use of swivel section 130, allowing the user to position the frame member 30 at an angle facing either the driver or passenger within the vehicle.

The plug-in power component 110 supplies electrical current 120 from the cigarette lighter component 16 of the motor vehicle (not sown) being used. The plug-in power component 110 includes an outer cylindrical shell 112 having a pair of retractable contact springs 114 and 116 for holding in place the plug-in power component 110 within the car's cigarette lighter component 16, and an integrally attached rear wall 124 having a cylindrical metal contact pole/nipple 118 for supplying electrical current 120 to device 10. Retractable contact nipple 118 is centrally located within a circular hole opening 122 located on rear wall 124.

ALTERNATE EMBODIMENT 200

The self-contained electronic message emitting device 200 and its component parts of the alternate embodiment of the present invention is represented in detail in FIG. 7 of the drawings. Device 200 of the alternate embodiment is used for sending a pre-recorded message only and this message cannot be changed by the user. Therefore no record button 86 or record switch 96 is necessary in this embodiment 200. In all other respects, the self-contained electronic message emitting device 200 of the alternate embodiment functions and operates in the same manner as the self-contained electronic message emitting device 10 of the preferred embodiment.

OPERATION OF THE PRESENT INVENTION

In operation, the user first places and plugs-in the electronic message emitting device 10 within the cigarette lighter component 16 of the motor vehicle (not shown) via the plug-in power component 110. When the user turns on the ignition of the motor vehicle the sound 14 of the recorded message is automatically activated via the automatic On/Off switch 98 and the electronic microchip 94 from within the electronic compartment 80. The sound 14 of the recorded message is then emitted from the speaker members 68 and 70 via the plurality of speaker slot openings 74a to 74n. Simultaneously, the automatic light switch 102 is activated to an On position which then turns on and lights-up the plurality of light bulbs 105a and 105b from within the lower front end 89 of electronic component member 80. The bulbs illuminate the outer and inner side perimeter edgings 42 and 44 of frame member 30 that illuminates the still picture 12 within frame member 30.

At the end of the recorded message, the device 10 is then turned Off via the automatic On/Off switch 98. The recorded message is then re-set to the beginning of the message via the automatic re-set switch 100 and, simultaneously, the light bulbs 105a and 105b are then turned to the Off position via the automatic light switch 102. The sound 14 of the recorded message is automatically activated again only when the car ignition (not shown) is turned to the On position.

Typically, the length of the recorded message may be 20 seconds to 120 seconds in length. To change the previously recorded message the user depresses the record button 86 which then activates the record switch 96 of the electronic microchip 94 of the modular circuit board 92. The recording of the new message by the user then replaces the previously recorded message. The user can also change the still picture 12 within frame member 30 via the slot opening 34 to receive another appropriate still picture 12 or photograph 12.

The device 10 or device 200 may be used for emitting a prerecorded message or a personalized message, such as a religious blessing, an info commercial about a specific product, a safety instructional tip, or a personalized singing message of happy birthday to the user, with the corresponding picture 12 of the religious figure, the info commercial product, instructional safety sign, or the user's family, respectively, within the illuminated frame member 30.

ADVANTAGES OF THE PRESENT INVENTION

Accordingly, an advantage of the present invention is that it provides a self-contained electronic message emitting device having a microchip with a pre-recorded message or a recordable message which is powered by plugging the device into the cigarette lighter of a car.

Another advantage of the present invention is that it provides for a self-contained electronic message emitting device having an illuminated picture frame for removably inserting and changing a still picture within the frame located on the front of the device.

Another advantage of the present invention is that it provides for a self-contained electronic message emitting device that is light-weight, easy to use, portable, convenient, and durable.

A further advantage of the present invention is that it provides for a self-contained electronic message emitting device that can be mass produced in an automated and economical manner and is readily affordable by the consumer.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A self-contained, electronic message-emitting device for providing a recorded message and having an illuminated framed insert contained therein, comprising:
   a) a housing unit including a frame member, a sound compartment, an electronic compartment, and a plug-in power component;
   b) said frame member including means for receiving an insert therein, a shield for protecting the insert, and diffusing means for diffusing light to illuminate the insert;
   c) said sound compartment including a plurality of speaker members, a recording microphone, and a plurality of speaker openings for emitting the sound of a recorded message from said speaker members;
   d) said electronic compartment for housing a modular integrated circuit board and circuit including an electronic microchip for recording a message, a record switch to activate said circuit to record a message, and a light source for illuminating said frame member; and
   e) said plug-in power component for supplying electrical current from a car's cigarette lighter apparatus to power said circuit.

2. An electronic message emitting device in accordance with claim 1, wherein said housing unit is made of plastic.

3. An electronic message emitting device in accordance with claim 1, wherein said diffusing means include an outer perimeter edging and an inner perimeter edging made of acrylic plastic for diffusing light for illuminating the insert.

4. An electronic message emitting device in accordance with claim 1, wherein said modular integrated circuit board further includes a reset switch to rewind the recorded message.

5. An electronic message emitting device in accordance with claim 1, wherein said modular integrated circuit board further includes an automatic On/Off switch to initiate and stop the recorded message.

6. An electronic message emitting device in accordance with claim 1, wherein said modular integrated circuit board further includes a voice-activated On/Off switch to initiate and stop the recorded message.

7. An electronic message emitting device in accordance with claim 1, wherein said light source for illuminating said frame member includes a plurality of light bulbs.

8. An electronic message emitting device in accordance with claim 1, further including means for moving said electronic compartment relative to said plug-in power component.

9. An electronic message emitting device in accordance with claim 1, wherein said insert is in the form of a picture, photograph, or transparency.

10. A self-contained, electronic message-emitting device for providing a recorded message and having an illuminated framed insert contained therein, comprising:
   a) a housing unit including a frame member, a sound compartment, an electronic compartment, and a plug-in power component;
   b) said frame member including a top wall having an elongated slot opening for receiving an insert therein; a shield for protecting the insert; and means for diffusing light to illuminate the insert;
   c) said sound compartment including a plurality of speaker members, a recording microphone, and a plurality of speaker openings for emitting the sound of a recorded message from said speaker members;
   d) said electronic compartment for housing a modular integrated circuit board and circuit including an electronic microchip for recording a message, a record switch to activate said circuit to record a message, a reset switch to rewind the recorded message, and a light source for illuminating said frame member;
   e) said plug-in power component for supplying electrical current from a car's cigarette lighter apparatus to power said circuit; and
   f) means for moving said electronic compartment relative to said plug-in power component.

* * * * *